United States Patent

[11] 3,586,078

[72] Inventors Douglas D. Hamilton
Town Mount Royal;
Domenico Benedetto, Montreal, both of,
Canada
[21] Appl. No. 833,021
[22] Filed June 13, 1969
[45] Patented June 22, 1971
[73] Assignees Canadian International Paper Company
Montreal, Quebec, ;
Quebec North Shore Paper Company
West Montreal, Quebec; Abitibi St. Anne
Paper Ltd., Beaupre, Quebec, Canada, part
interest to each
[32] Priority June 17, 1968
[33] Canada
[31] 022,728

[54] TREE PROCESSING OFF-FEED ASSEMBLY
20 Claims, 14 Drawing Figs.
[52] U.S. Cl. ................................................... 144/3 D,
214/77
[51] Int. Cl. ....................................................... A01g 23/02
[50] Field of Search ........................................... 144/2 Z, 3
D, 34, 309 AC; 214/3, 77

[56] References Cited
UNITED STATES PATENTS
3,329,184 7/1967 Longert ....................... 144/3 D
3,455,352 7/1969 Sanders et al ................. 143/46 R
3,500,882 3/1970 Tanguay ....................... 143/46 R

*Primary Examiner*—Gerald A. Dost
*Attorney*—Craig, Antonelli, Stewart and Hill

ABSTRACT: A tree processing machine including an attachment therefor to collect and unload logs discharged from the processing units on the machine. The tree collecting and unloading is a tree-handling off-feed assembly detachably secured either to the undercarriage of the vehicle or to a platform pivotally mounted on the carriage for movement with the processing units or pivotally mounted on the undercarriage to slew about a vertical axis independent of slewing of the platform on which the processing units are mounted. The off-feed assembly includes a pair of arcuate collecting arms in one form pivotally secured to the frame of the off-feed assembly so as to enable movement of the same when struck by an object during movement of the mobile tree processing machine. The off-feed mechanism further includes an operator's station consisting of a cab providing an enclosure for the operator and a boom and grapple assembly pivotally mounted thereon or adjacent thereto such that an operator in the cab has a commanding view of logs collected on the arcuate arms and with suitable controls is able to manipulate the boom and grapple assembly to remove the collected logs. The arms which are provided for collecting the trees may also be referred to as a cradle and there may be one located on each of opposite sides of the frame with a movable deflector selectively directing processed logs into one or the other whereby cradle is being loaded, the other may be unloaded without interfering with the processing operation.

FIG.1.

INVENTORS
DOUGLAS D. HAMILTON and DOMENECO BENEDETTO
BY
Craig, Antonelli, Stewart & Hill ATTORNEYS

TREE PROCESSING OFF-FEED ASSEMBLY

This invention relates to log-processing apparatus and particularly to an improved mobile tree-processing vehicle including an off-loading device.

In recent years, a number of developments have occurred concerning mobile tree-processing equipment, one of which includes the machine illustrated in U.S. Pat. No. 3,351,107 issued Nov. 7, 1967. The mobile processing vehicle includes boom and grapple means for picking up and feeding a tree to a processing assembly which includes a delimber, a debarker and a shear. In trailing relation with respect to the direction of feed of a tree being processed, there is a cradle for receiving the processed wood and the present invention is concerned with a vehicle of the same general type including modified apparatus for collecting and handling the processed wood. A machine of the above patented-type processes trees rapidly and thus necessitates efficient handling of the processed wood in order to fully utilize the capabilities of the remainder of the machine.

A further proposal for a tree-processing machine consists of a mobile processing unit as disclosed in the above U.S. Pat. No. 3,351,107 but which has a conveyor assembly attached adjacent the out-feed end in place of the cradle. In such proposal, the conveyor delivers the processed logs from the last of the processing units to a position on the ground adjacent the machine. This latter further development of the above apparatus is fully disclosed in U.S. application Ser. No. 727,316 filed May 7, 1968. In each of the foregoing proposals for the off-feed mechanism, the off-feed mechanism handles and collects the logs in the sequence in which they emerge from the processing units. The collecting of the processed logs in sequence has the disadvantage of not being able to sort the logs immediately as they emerge from the last of the processing units. In some operations, it is desirable to separate logs for example, those suitable for pulpwood from other logs which, for example, might be suitable as saw logs, i.e. for later being cut up into lumber.

Accordingly, one object of the present invention is to provide an off-feed assembly for a tree-processing machine which permits sorting and selectively collecting logs as they emerge from the processing units.

A further object of the present invention is to provide an off-feed assembly for a tree-processing machine which expedites handling the logs by being able to stack the processed logs higher and also one which permits manipulating the logs, for example, partially turning them or even turning them end to enable neat stacking and piling of the logs and also better positioning them relative to the vehicle.

A still further object of the present invention is to provide a separate and independent component which may be readily detachable secured to a mobile tree-processing machine for conveniently and efficiently handling the processed logs as they are discharged from the last of the processing units on the processing machine.

A still further object of the present invention is to provide a tree-processing machine which includes in combination therewith, separate means for off-loading processed trees collected on the machine during processing thereof.

In accordance with one aspect of the present invention, there is provided an independent log-handling assembly adapted to be attached to a machine used for processing trees comprising in combination: (a) a rigid frame assembly: (b) means for attaching said frame to a machine having tree-processing equipment thereon; (c) means for attaching said frame to a machine having means on said rigid frame assembly for supporting a plurality of logs disposed generally in alignment with one another; (d) a boom and grapple assembly pivotally secured to said frame at a position in selected spaced relationship with respect to logs collected thereon; and (e) means for operating said boom and grapple assembly.

In accordance with another aspect of the present invention, there is provided a tree-processing machine which comprises in combination: (a) a mobile base; (b) at least one processing unit counted on said base; (c) a first boom and grapple assembly mounted on said base and disposed in a position for grasping trees in the vicinity of the machine and feeding the same to the processing units mounted on said base; and (d) an off-feed mechanism which is a component distinct and separate from said machine but attached thereto and including a rigid frame assembly, means for attaching said rigid frame assembly to said mobile base, means on the rigid frame assembly for supporting a plurality of logs stacked generally in alignment with one another, a boom and grapple assembly pivotally secured to said frame at a position disposed in selected spaced relationship with respect to logs collected thereon and means for operating said boom and grapple assembly.

The off-feed mechanism in each of the foregoing embodiments preferably includes a pair of hook members facing upwardly and disposed in horizontal spaced relation thus providing an open area therebetween where the grapple jaw may readily clampingly embrace the stack of logs supported on the arms. Also, in each of the foregoing embodiments, the means for operating the boom and grapple preferably consists of an operator's station having the boom and grapple assembly mounted thereon.

The invention is illustrated, by way of example, in the accompanying drawings wherein.

Figure 1:
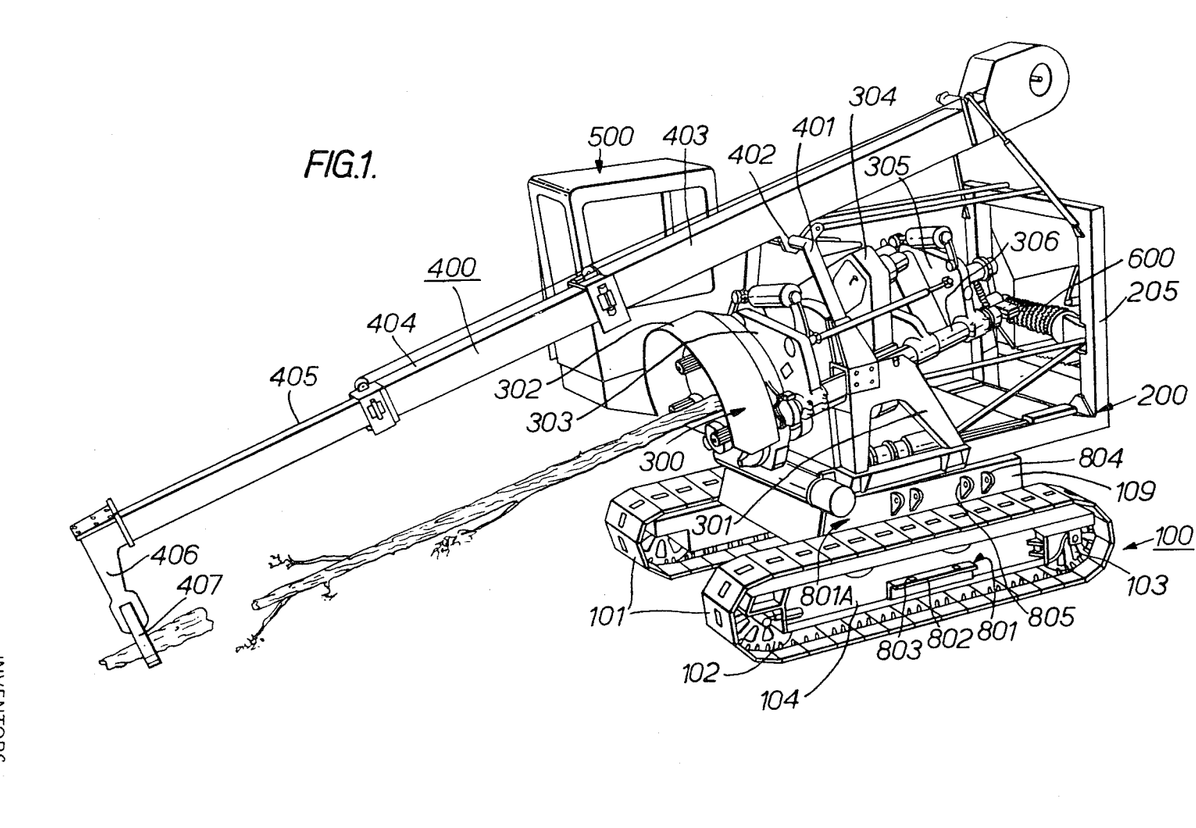
FIG. 1 is an oblique view of a mobile tree-processing assembly incorporating means for detachable mounting an off-feed mechanism thereto.

Referring now in detail to the drawings, in FIG. 1, there is illustrated a mobile tree-processing machine consisting of a mobile base 100 including a pair of endless tracks 101 mounted on respective ones of a pair of beams 104 carrying a frame 109. The endless tracks are mounted on respective idler and drive wheels 102 and 103 journaled respectively, to opposed ends of the beams 104. Mounted on the frame 109 is a platform 200 which preferably is journaled on the frame for pivotal movement about a substantially vertical axis. The platform 200 carries thereon a processing assembly 300 pivotally supported on a pair of A-frames 301 for pivotal movement within selected limits about a substantially horizontal axis. The processing assembly 300 includes a delimber 302 followed by a first set of feed rolls 303, a debarker assembly 304, a second set of feed rolls 305, and a shear mechanism not illustrated. The processing units 302 to 305 inclusive are mounted on a pair of horizontally spaced beam members 306 which, in turn, are pivotally supported on respective ones of the pair of A-frames 301. The construction and operation of the delimber 302, the feed rolls 303 and 305, the debarker 304 and the shear (not illustrated) are covered fully in the aforementioned U.S. Pat. No. 3,351,107.

A boom assembly 400 is mounted on the platform 200 by an A-frame 401 interconnecting the spaced pair of A-frames 301. The A-frame 301 straddles the processing assembly and is pivotally secured to the boom 400 by a journal assembly 402. The boom 400 is of the telescopic-type consisting of a fixed section 403 and movable sections 404 and 405 telescopically mounted therein. Extension and retraction of the boom sections is also fully disclosed in the aforementioned U.S. patent. Secured to the outer end of the innermost telescopic section 405 is a grapple assembly 406 having a jaw 407 which may be readily opened and closed by an operator. The operator is located at a station in a cab 500 offset from the feed path along which a tree travels during processing thereof and is carried on the platform 200. Secured to the platform 200 is an upwardly directed pair of posts 205 located one on each side of a path along which the tree travels during processing. Journaled on the pair of posts 205 is a speedup or off-feed roller 600 which is driven to facilitate removing the processed log from the last of the processing units.

Figure 2:
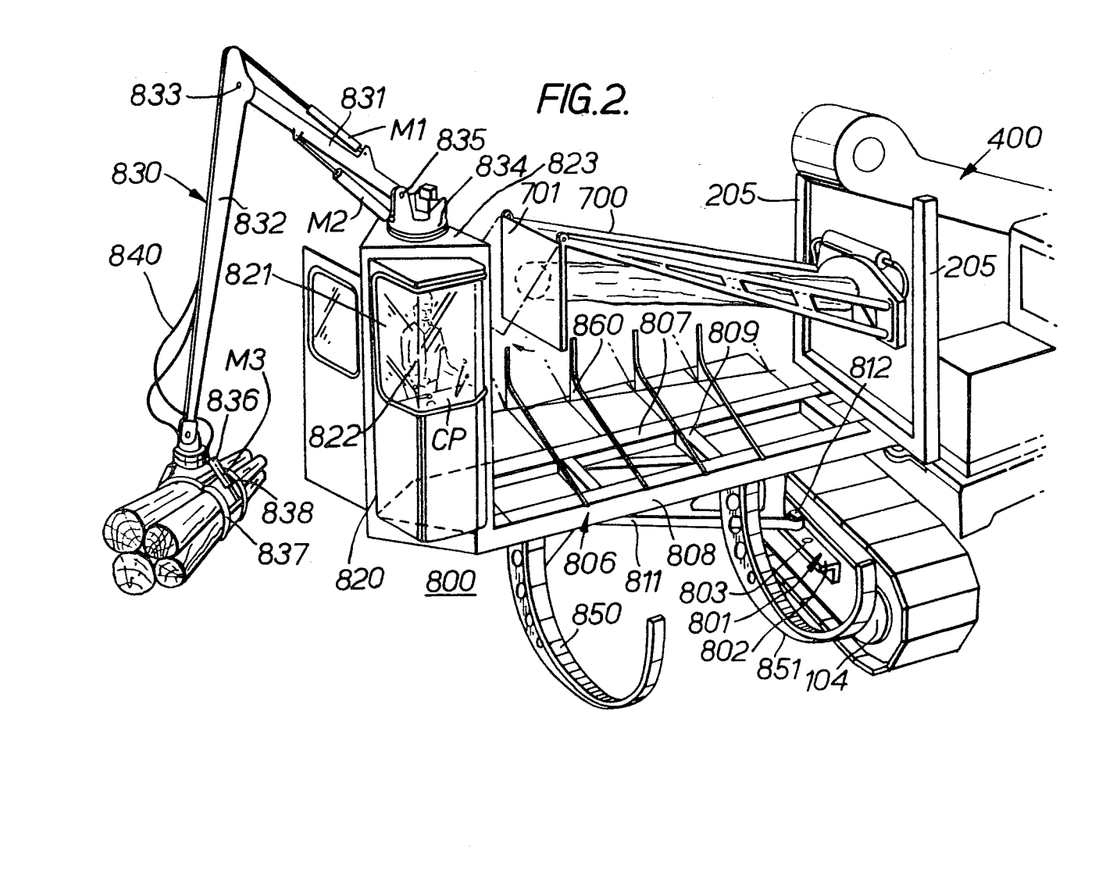
FIG. 2 is an oblique view of a portion of the tree-processing vehicle illustrated in FIG. 1 and including an off-feed mechanism attached thereto.
Figure 3:
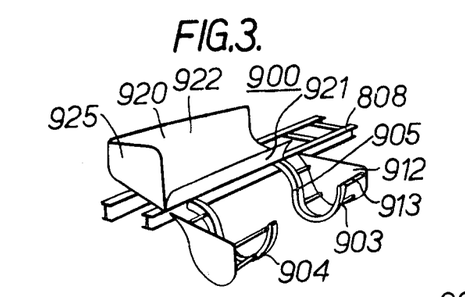
FIG. 3 is an oblique partial view of a portion of a modified off-feed mechanism.
Figure 4:
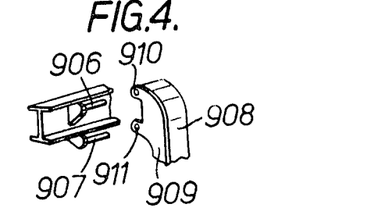
FIG. 4 is an oblique partial view diagrammatically illustrating means of attaching tree-collecting and holding means to the frame of the off-feed mechanism illustrated in FIG. 3.

As illustrated in FIG. 2, the mobile processing machine includes a measuring unit 700, projecting rearwardly from the pair of posts 205, having a flapper plate 701 engageable with the leading end of a tree being processed. Movement of the flapper plate 701 initiates actuation of the shear unit for severing a selected length off the leading end of the tree being processed.

Figure 6:
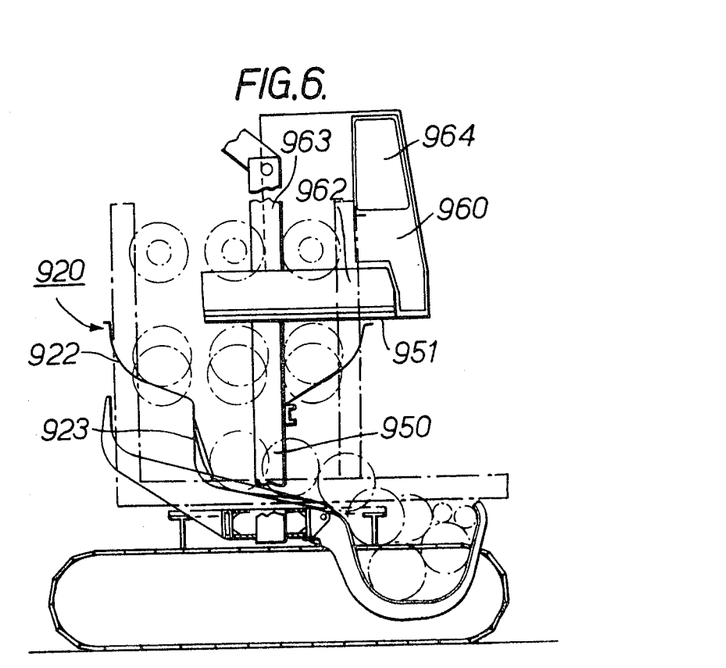
FIG. 6 is a partial rear and partial broken elevational view of the apparatus illustrated in FIG. 5.
Figure 7:
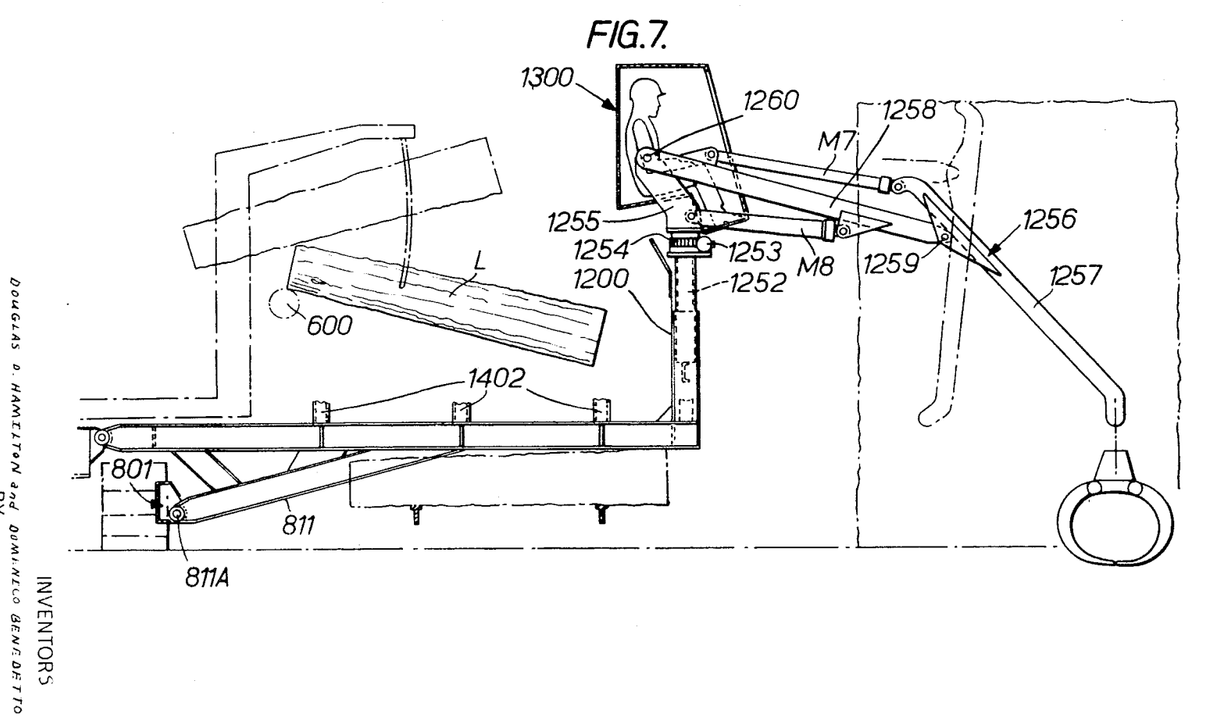
FIG. 7 is a partial sectional side elevational view of an off-feed mechanism similar to that illustrated in FIG. 2 taken from in the reverse of that in FIG. 2.
Figures 8, 9:
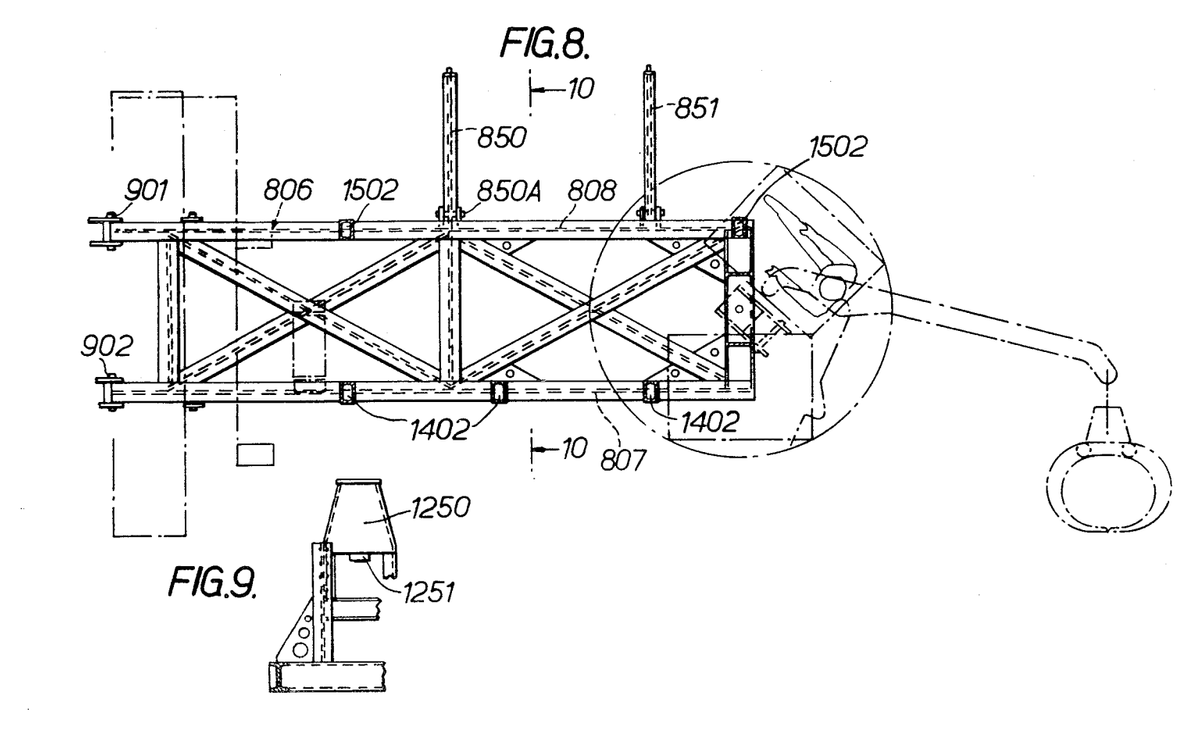
FIG. 8 is a partial sectional and top plan view of the off-feed assembly illustrated in FIG. 7.
FIG. 9 is a partial right-hand side elevational view of FIG. 7.

In accordance with the present invention, there is provided for a machine of the foregoing type and also in combination therewith, an off-feed mechanism 800 which may be readily attached thereto. The off-feed mechanism 800 is rigid subassembly and is a component separate and distinct from the machine itself. Accordingly, the off-feed mechanism is adapted to be attached to a machine and may be detached therefrom in the event the off-feed mechanism is not required or, alternatively, should circumstances make it desirable for having a different type of mechanism substituted therefor. By having a separate subassembly or component which may be attached, there is provided a vehicle for processing trees which is relatively versatile. In FIG. 2, there is represented one embodiment of an off-feed mechanism while a further embodiment is illustrated in FIGS. 3 to 6 inclusive. The still further embodiment of the off-feed mechanism is illustrated in FIG. 7 and an alternative mounting arrangement for the off-feed mechanism is illustrated in FIG. 8.

Referring to FIGS. 1 and 2, the beam 104 of the mobile base is provided with a first or lower bracket 801 rigidly secured thereto and includes two sets of lugs 804 and 805 disposed in horizontal spaced relation, with respect to one another and each having an aperture therethrough. The lugs 804 and 805 are arranged such that the apertures are in horizontal alignment. The off-feed mechanism 800 includes a frame 806 detachable secured to the lower bracket 801 and the upper bracket 801A. The frame 806 consists of a pair of box members 807 and 808 interconnected by a plurality of struts or crossmembers 809 welded or otherwise rigidly secured thereto. Gusset plates may be welded to the respective members 807 and 808 and the crossmembers 809 to reinforce the assembly. The frame is provided with a support 811 projecting downwardly therefrom and which is detachable securable to the lower bracket 801 by a pin or bolt 812.

The box members 807 and 808 and/or a crossmember adjacent one end thereof have an apertured lug or lugs adapted to be connected to respective ones of the pair of lugs of the upper bracket 801A by pins or the like.

Included on the frame 806 is an upwardly directed portion 820 located adjacent the end thereof remote from that which is attached to the mobile base of the processor. The upwardly directed portion 820 includes an enclosure 821 for an operator 822 and a top portion 823 to which a boom and grapple assembly 830 is pivotally mounted. The boom and grapple assembly includes a knuckle boom having a first section 831 and a second section 832 pivotally interconnected by a pin 833. The boom element 831 is pivotally mounted on the enclosure top portion 823 by a rotary mounting 834. The boom element 832 is controllably moved relative to the element 831 by a hydraulic motor M1. The boom element 831 is pivotally connected to the rotary mounting 834 by a pin 835 and controllably pivoted thereabout by a hydraulic motor M2.

A grapple assembly 836 is suspended from the free end of the boom element 832 and is preferably of a type adapted specifically for handling trees, for example, that illustrated in Canadian Pat. No. 659,445 issued Mar. 12, 1963. The grapple 836 and that illustrated in the latter mentioned patent includes a pair of jaw members movable toward and away from each other and each consists of a pair of arcuate arms 837 and 838 disposed in spaced relation longitudinally along the tree. The grapple jaw may be opened and closed, for example by hydraulic motors M3 with fluid to and from such motors being conducted through a pair of conduits 840. The operator 822 may readily control movement of the grapple jaw by valves located on a control panel CP at the operator's station. Fluid may be supplied through a line (not shown) from a primary power source on the main mobile processing machine and fluid from the valves on the control panel may be suitably conducted through suitably arranged channels in the rotary coupling 834. The channels may be arranged so as to provide, if desired, full 360° rotation of the boom about a vertical axis.

The off-feed mechanism 800 further includes a pair of arms 850 and 851 detachable secured to the frame 806 and depending downwardly therefrom. The arms 850 and 851 are disposed in horizontal spaced relation with respect to one another and form a cradle for receiving a plurality of processed trees and hold the same in stacked relation. The trees are collected in sequence as the leading end is continually severed from the tree being processed and, in this regard, a plurality of deflector arms 860 are secured to the frame and project upwardly therefrom in sloping relation toward the cradle to direct severed tree sections onto the arms 850 and 851.

Referring to FIGS. 3 to 6 inclusive, there is illustrated an off-feed mechanism 900 which includes a rigid frame 806, a modified log guide means and modified arcuate arms for collecting the processed logs. The frame 806 is detachable securable to the frame 109 of a mobile processor in the same manner as previously described, as, for example, by pins 901 and 902. Arcuate arms 903 and 904 corresponding, respectively, to arcuate arms 851 and 850 illustrated in FIG. 2 are essentially a mirror image of one another and each includes a rigid arcuate arm portion 905 detachable securable to the beam 808 of frame 806 by a pair of pins 906 and 907 (see FIG. 4). The arms 905 may be T-shaped, having an upper flange portion 908 and a rearwardly and downwardly directed web portion 909. The web may be provided with a pair of lugs 910 and 911 apertured to receive respective ones of the pins 906 and 907 for detachable securing the arm to the frame. Each arcuate arm 903 and 904 further includes an end plate 912 secured thereto by a plurality of struts 913. The pair of end plates 912 provided by arms 903 and 904 are located in spaced relation with respect to one another and provide end guides for maintaining the collected logs substantially in alignment with one another.

The off-feed mechanism 900 includes log guide means consisting of deflectors 920 and 921 for directing severed logs onto the collecting arms 903 and 904. The deflector 920 includes a sidewall 922 which is arcuate and terminates in a downwardly directed portion 923 attached to, or at least supported on, the frame 806. The deflector 921 is arcuate and terminates vertically above the frame 806, thus providing an opening for discharging the processed log onto the arcuate arms 903 and 904. As illustrated in FIG. 6, the deflectors 920 and 921 effectively provide a hopper having sidewalls converging inwardly and downwardly toward an opening in a sidewall of the deflector assembly. The deflector 920 is provided with an end wall 925 limiting the forward motion of a log discharged from the last of the processing units of the tree-processing machine. A vertical post 950 is rigidly secured to the frame 806 and projects upwardly therefrom at a position beyond the deflectors 920, 921 and the processed wood-collecting area provided by arms 904 and 905. The post 950 projects vertically above the guide members 920 and 921 and is provided with a generally flat, horizontally disposed plate 951.

Figure 5:
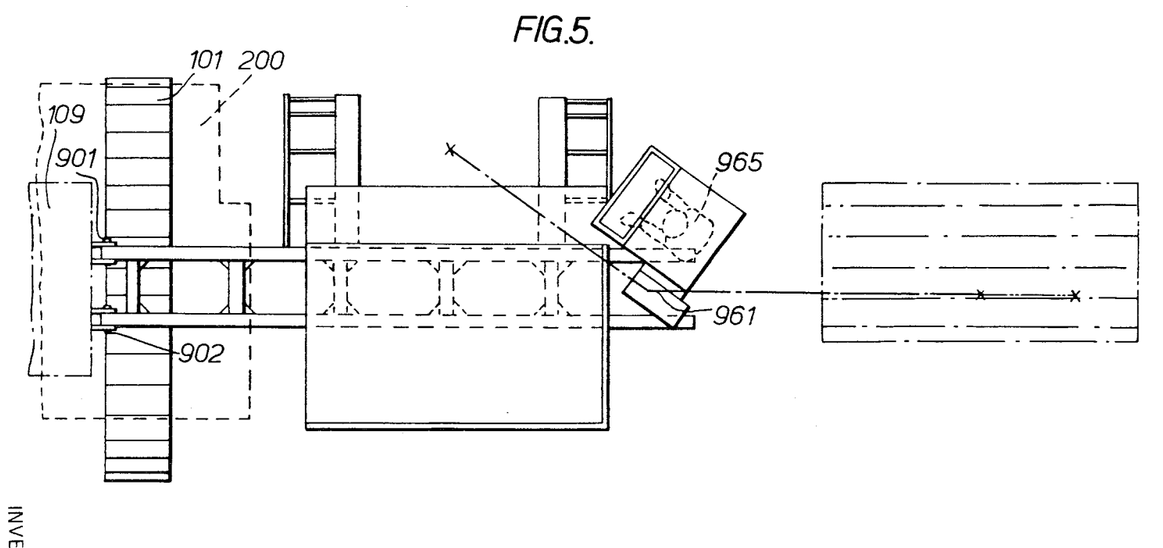
FIG. 5 is a partial top plan view of an off-feed mechanism incorporating the apparatus illustrated in FIG. 3.

An operator's station and boom support 960 is pivotally mounted on the plate 951 for selected pivotal movement about a vertical axis 961 (see FIG. 5). The operator's station and boom support 960 includes a portion 962 to which the boom and grapple assembly 963 is rigidly secured. For convenience of illustration, the grapple assembly is not illustrated but it is to be understood that a grapple of the type illustrated in FIG. 2 or any other type may be attached to the free end of an extendible and retractable boom, for example a knuckle-type as illustrated. The assembly 960 further includes a cab 964 which provides an enclosed area for an operator 965. From the structure illustrated in FIGS. 5 and 6, it will be clearly evident that the operator 965 pivotally about the vertical pivot axis 961 along with the boom and grapple assembly, thus ensuring the operator has a clear view of the grapple assembly, thus ensuring the operator has a clear view of the grapple assembly during operation of the boom and grapple assembly. Also, in the embodiment illustrated in FIGS. 5 and 6, the operator is located vertically above the wood being discharged as well as that being collected and is at such a vertical extent to facilitate piling the collected processed wood in relatively high stacks while, at the same time, provides a commanding view of the situation.

During operation, the mobile tree-processing machine illustrated in FIG. 1 with an off-feed mechanism thereon is maneuvered into a position where the vehicle is at the butt ends of a plurality of trees piled for processing. The tracks of the vehicle are positioned to extend in a direction substantially perpendicular to the length of the trees and the operator in cab 500, by manipulating suitable controls, extends the boom 400 outwardly and grasps a tree in the grapple jaw 407. He then retracts the boom feeding the grasped tree into the first of the processing units whereafter it is propelled through the processing units by the feed rolls in a manner fully described in the aforementioned U.S. Pat. No. 3,351,107. The leading end of the tree being processed is continually severed and the severed sections fall by gravity onto the deflectors 860 which direct the trees in sequence onto the arms 850 and 851. The guides 920 and 921 may be used in place of, or in combination with, the deflectors 860 in which case they assist in appropriately directing the processed logs. After a group of trees has been piled or collected on the arms, the operator 822 then manipulates the boom and grapple assembly mounted vertically above him to pick up and remove the load of trees from the arms and place such load in a stack on the ground adjacent to the vehicle. Alternatively, the operator can readily place the collected trees in a vehicle located nearby in the event the trees are to be transported immediately to a remotely located mill.

In each of the foregoing embodiments, the off-feed mechanism is attached to the mobile base 100. In which case, the processing assembly mounted on the platform 200 swings about a vertical axis at the will of the operator in cab 500 independent of what the operator 822 might be doing. The operator 822 accordingly is free to stack the processed logs at whatever location he may desire within the limits of the reach of the boom. In this regard, it will be noted the boom and grapple assembly is mounted on the frame 806 remote from the position at which the same frame is attached to the mobile vehicle. This gives maximum reach and clearance for handling the processed logs. The location of the boom and grapple assembly generally is such as to enable collecting logs in the cradle, remove the same therefrom and deposit such logs at some selected location remote from the vehicle.

The off-feed mechanism alternatively may, if desired, be attached to the platform 200 in which case the brackets 801, for example, may be secured to the horizontal portion of the platform 200 while the upper bracket 801 may be attached to the posts 205 in any convenient manner. Attaching the off-feed mechanism to the platform 200 has the advantage of collecting the trees irrespective of the pivotal movement of the processing assembly about a vertical axis as previously described. There is, however, the disadvantage of having operator 822 moving from one position to another, hindering depositing the collected logs on a location stationary relative to pivotal movement of the processing assembly. Movement of the operator 822 may also have some effect on such operator where he has no control of the movement from a psychological point of view. There is also the disadvantage of connecting the off-feed mechanism to the platform and that is placing considerable twisting and tilting forces on the pivotal mounting of the platform 200 to the tractor or mobile base 100. The logs collected on arms 850 and 851 represent a relatively heavy load and by virtue of being located considerably outwardly from the pivot axis of the platform, it would have the effect of placing twisting forces on the pivotal mounting. This might be reduced somewhat by having a support on frame 806 projecting downwardly to engage the ground. A support of this nature would have to be vertically adjustable to follow variations in the terrain during movement of the vehicle, and/or platform 200. Such support may consist of a vertically adjustable leg secured to the frame 806 at some position spaced outwardly from the vehicle, for example, below the operator's station 820.

Figure 14:
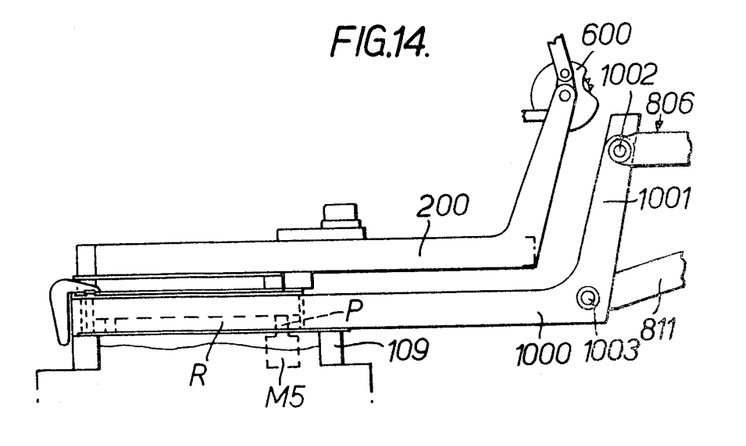
FIG. 14 is a partial elevational and sectional view diagrammatically illustrating a modified mounting for the off-feed assembly illustrated in FIGS. 2 to 12 inclusive.

Instead of having the off-feed mechanism secured to the base 100 as illustrated in FIG. 2 or attached to the platform as previously discussed, it may be mounted independent of the platform and base. Such further modified version is illustrated in FIG. 14 wherein there is diagrammatically illustrated an off-feed mounting frame assembly 1000 interposed between the platform 200 and the frame 109 of the mobile base. The off-feed mounting frame assembly 1000 is pivotally mounted in any convenient manner for pivotal movement about a vertical axis Y-Y which preferably is coincident with the pivot axis of platform 200. Slewing of the frame 1000 may be effected by the motor M5 having a pinion P meshing with an internal ring gear R attached to the frame 1000. The motor M5 having the pinion thereon may be suitably secured in any convenient manner to the frame 109. The frame 1000 includes a horizontal portion terminating in an upwardly directed end portion 1001 disposed laterally outwardly of the frame 200. The frame 806 of the off-feed mechanism may be attached to the frame member 1001 by, for example, a pin 1002 and similarly, bracing struts 811 may be attached vertically therebelow by a pin 1003. In an arrangement such as this, motor M5 would preferably be under the control of operator 822 while the slewing of platform 200 about the same axis would be under the control of the operator in cab 500, that is, the operator of the processing assemblies.

Referring to FIGS. 7 to 10 inclusive, there are illustrated further modifications to the processing assembly. Referring to FIGS. 7 and 8, there is illustrated a rigid frame assembly 806 which is detachably securable to a mobile tree-processing machine by a pair of pins 901 and 902. The frame is further supported by a strut 811, as previously described, which is detachable securable to the lower mounting bracket 801 by, for example, a pin 811A. The pins 901 and 902 attach the frame 806 to the upper mounting bracket 801A which, as previously described, is secured to the frame 109 of the mobile base. A pair of arms 850 and 851, as previously described, are mounted each by a single pin 850A, instead of a pair of pins as described previously with reference to FIGS. 3 and 4. An abutment 850B on the frame 806 engages each arm 850 and 851 at a position below the pivot pins 850A to retain the arms in the desired position. The single pin mounting permits pivotally moving the arms upwardly and this may be deliberately done, for example, by the operator 822 through suitable manipulation of the boom and grapple assembly or, alternatively, movement will take place by the arms striking an object during maneuvering of the mobile processor. The single pin pivotal mount of the arms permits the same being placed relatively low and no damage will be caused by the arms striking an obstacle during movement of the vehicle. It is obvious, for example, by reference to FIG. 10, that with the off-feed mechanism attached to the vehicle moving in a direction to the left as viewed in FIG. 10, will allow the arms to slide over obstacles which may be encountered during such movement The off-feed mechanism illustrated in FIGS. 7 and 8 further includes an end frame assembly 1200 projecting upwardly from the other free end of the rigid frame assembly 806 and pivotally secured thereto is an operator's station 1300. The frame 1200 serves as an abutment for a log L discharged from the last of the processing units and propelled onto the frame 806 by the previously described driven speedup roll 600. Frames 1200 accordingly provide a stop limiting forward motion of the processed logs. Attached to the upper end of the end frame 1200 is a portion of a rotary mounting 1250 for pivotally mounting the operator's station and boom assembly. The mounting portion 1250 includes a vertically extending sleeve 1251 for pivotally receiving a vertical post 1252. Pivotal movement of the post 1252 may be effected by, for example, a worm gear 1253 driven by a motor (not shown) engaging a gear 1254 secured to the post 1252. The post 1252 has a portion 1255 projecting upwardly which provides a support for the operator and also has a knuckle boom assembly 1256 attached thereto. The knuckle boom consists of members 1257 and 1258 pivotally interconnected by a pin 1259 with relative movement of the same being effected by a hydraulic or motor assembly M7. The boom element 1258 is attached to the upwardly extending post portion 1255 by a pin 1260 and controllably pivoted thereabout by a hydraulic cylinder or motor unit M8. As diagrammatically illustrated in FIG. 8, the operator's station 1300 is located laterally to one side of the vertical pivot axis of the boom assembly. The off-feed mechanism illustrated in FIGS. 7 to 12 inclusive includes a pair of laterally spaced log guide members 1400 and 1500 located vertically above the rigid frame 806. The guide 1400 includes a plate 1401 secured to three vertically disposed posts 1402 mounted on the frame member 807. The posts 1402 are secured to the frame member 807 as, for example, be welding and project upwardly therefrom. The plate 1401 has a generally horizontal portion 1403 supported by gusset members 1404 projecting outwardly from the posts 1402, a vertical portion 1405 and a further generally horizontal portion 1406 supported at an incline on the frame 806 by wedge-shaped members 1407. The guide 1401, accordingly, is sloped to appropriately direct the logs into the cradle formed by arms 850 and 851. The guide 1500 consists of a plate 1501 sloped in the opposite direction to that of 1401 and it is supported on a pair of posts 1502 projecting upwardly from the frame member 808. The plate 1501 is appropriately supported by gusset members 1503 attached to the posts 1502. The logs discharged from the processing units, accordingly, are directed by the guides 1400 and 1500 to fall through the space therebetween and striking the inclined plate portion 1406 located vertically therebelow. The posts 1502, as illustrated in FIG. 8, are spaced horizontally sufficiently from one another to allow the logs to roll therebetween onto the arms 850 and 851.

Figures 10, 11:
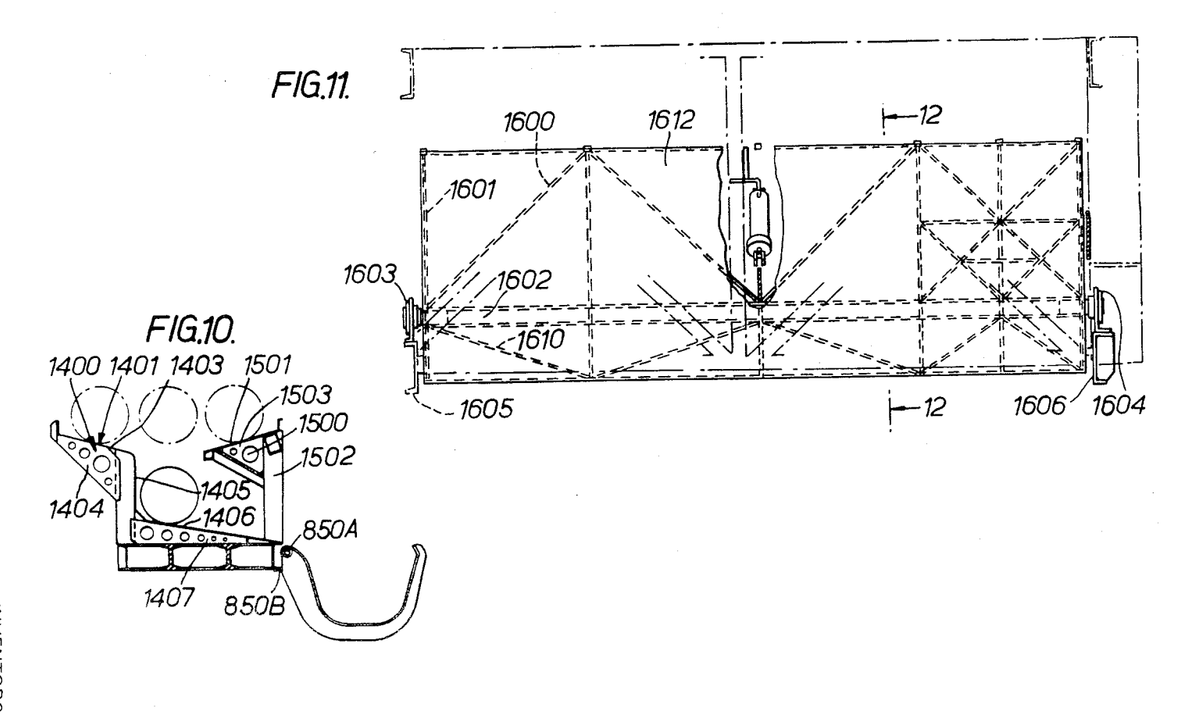
FIG. 10 is a view taken substantially along section 10–10 of FIG. 8.
FIG. 11 is a partial top plan view of an attachment for the off-feed assembly illustrated in FIGS. 7 to 10.
Figure 12:
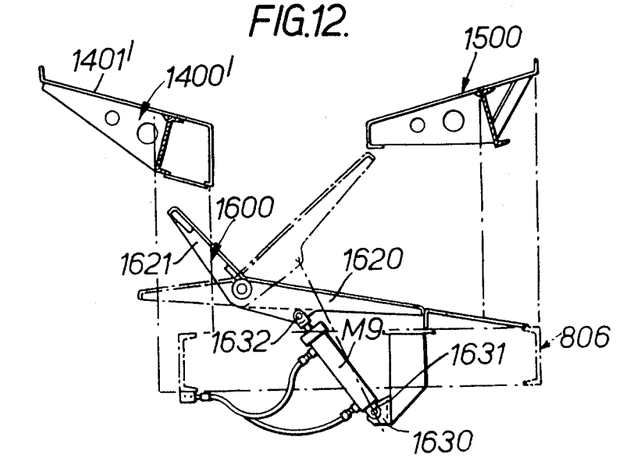
FIG. 12 is a partial cross-sectional view taken substantially along section 12–12 of FIG. 11.
Figure 13:
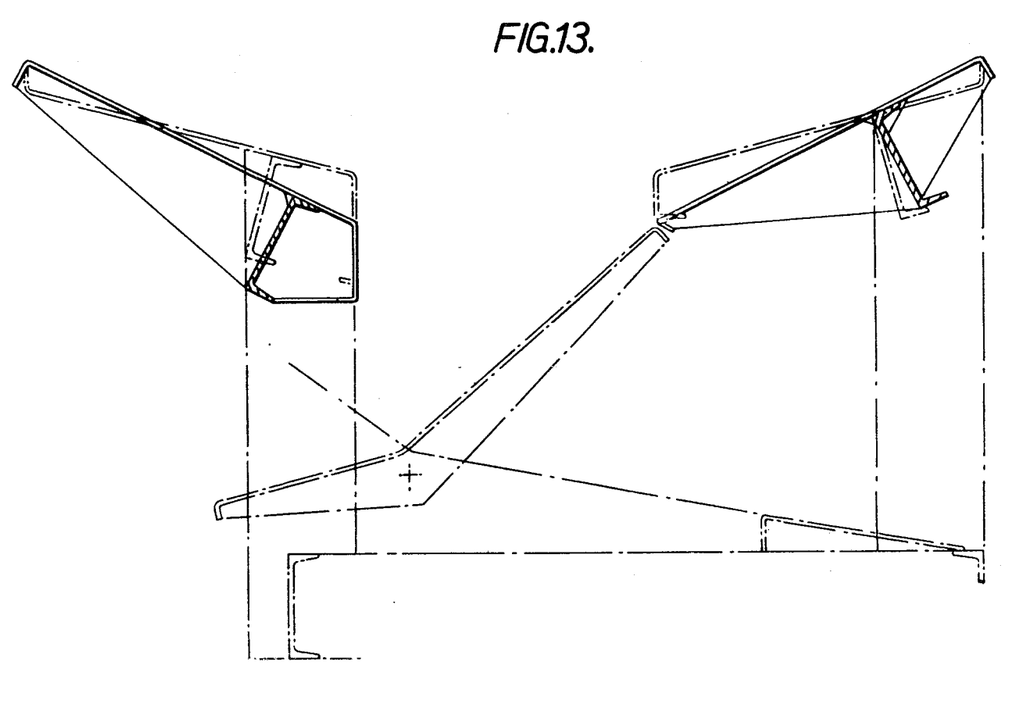
FIG. 13 is a view similar to FIG. 12 but illustrating further modifications.

A further modification is illustrated in FIGS. 11 and 12 and 13 which consists of a pivotally mounted deflector 1600 mounted for selectively directing the processed logs onto the collector arms 850 and 851 or alternatively, deflecting the log to one side of the off-feed mechanism and onto the ground adjacent the mobile tree-processing plant. The deflector 1600 includes five generally L-shaped arms 1601 mounted in horizontal spaced relation on a shaft 1602 journaled at opposed ends respectively on bearings 1603 and 1604. The bearings 1603 and 1603 are attached to respective posts 1605 and 1606 which are secured to the frame member 807 and project upwardly therefrom in place of the three posts 1402 illustrated in FIG. 8. The L-shaped arms 1601 may be suitably interconnected and reinforced by crossbracing members 1610 and supported on such crossbracing and the arms 1601 is the plate member 1612. Vertically above the deflector 1600 are horizontally spaced log-directing assemblies 1400' and 1500'. The director 1500' is the same as described above with reference to FIG. 10 while the director 1400' is similar but does not include the plate portion 1405 and 1406 as previously described. Instead, the log director 1400' includes the sloped upper horizontal plate portion 1401' terminating in a short downwardly directed end section located vertically above the deflector 1600. The L-shaped deflector arms 1601 have a relatively long leg 1620 and a shorter leg portion 1621. With the assembly being pivotable such that in one position, the log is discharged to the left as viewed in FIG. 12 and in the other position, the log is discharged to the right. Discharging to the right as viewed in FIG. 12 directs the logs onto the arms 850 and 851 and this will be obvious when it is realized FIGS. 10 and 12 are correspondingly oriented. The arms 850 and 851 are not shown in FIG. 12 but are attached and located in the same position as that illustrated in FIG. 10. The deflector 1600 is pivotally mounted by a hydraulic motor or cylinder assembly M9 connected at one end to the frame 806 by a bracket 1630 and at the other end to one of the arms 1601 respectively by pivot pins 1631 and 1632. The pivotally mounted deflector 1600 permits directing logs onto the arms for collecting the same or alternatively, directing unwanted portions, for example, tops or logs which are shorter then permitted to the left and in which case, they are dumped directly onto the ground.

In a still further modified version, the deflector 1600 may be utilized in combination with the assembly illustrated in FIG. 8, in which case, posts 1605 and 1606 are used in combination with the posts 1402. The posts 1402, accordingly, serve a gate preventing discharge of the logs to the left as viewed in FIG. 12 such that the apparatus 1600 operates as a gate preventing logs from flowing onto the collector arms 850 and 851. An arrangement such as this permits interrupting the flow of logs onto the collector whereby logs previously deposited thereon may be collected without interrupting the processing operation. Trees which are processed while the logs are removed are collected and held on the gate and when the load of logs has been removed from the arms, the gate can then be opened allowing the few logs collected thereon to flow onto the collecting arms.

From the foregoing, it is readily apparent there is provided an attachment for a mobile vehicle wherein such attachment includes means for receiving and collecting a plurality of trees in stacked relation and also means for unloading the collected trees. The attachment may be detachable secured to a processing vehicle and is effectively a unitary component detachably securable to any type of processing vehicle and not necessarily the one which has been illustrated in FIG. 1. It will also be readily apparent the operator for the off-feed mechanism is located downstream of the processing units and at an elevated position providing a commanding view of the situation. A cab may be suitably provided lending comfort to the operator and thus, rendering an improved environment not only from a safety, but also from a comfort, point of view. The boom also is positioned relatively high allowing higher piling of the processed logs than with the previously described off-feed mechanism consisting of a driven conveyor. The pivotal movement and mounting of the boom and grapple permits placing the processed logs which have been gathered from the collecting mechanism and thus permits a wide choice of direction in stacking the logs on the ground. Also in the foregoing disclosure, it is seen there is provided an off-feed mechanism with the ability to sort various types of wood. The boom and grapple assembly also may be utilized for other purposes such as cleaning the off-load area in the vicinity of the machine and also for example in the maintenance of equipment such as lifting and replacing components in the processing assembly.

We claim:
1. A tree-processing processing machine which comprises in combination:
 a. a mobile base;
 b. at least one processing unit mounted on said base;
 c. a first boom and grapple assembly mounted on said base and disposed in a position for picking up felled trees and feeding the same to the processing unit mounted on said base; and
 d. a tree off-feed mechanism detachable secured to said machine, said off-feed mechanism including a frame, means for detachable securing said frame to the vehicle, means on the frame for supporting a plurality of logs stacked substantially in alignment on one another, a boom and grapple assembly pivotally mounted on said frame for slewing about a vertical axis, said boom and grapple including an extendible and retractable boom having a grapple suspended from adjacent the free end thereof and located at a position remote from logs collected on said log-supporting means and remote from the attachment of said frame to the vehicle and means for operating said boom and grapple assembly.

2. A tree-handling attachment as defined in claim 1, including an operator's station having an enclosure, for the operator, mounted on said frame adjacent said boom and grapple assembly.

3. A tree-handling attachment as defined in claim 2, including means pivotally mounting said enclosure on said frame for movement about a substantially vertical axis.

4. A tree-handling attachment as defined in claim 2 wherein said enclosure is located in an elevation vertically above the log-supporting means.

5. A tree processing machine as defined in claim 1 wherein said means on the frame for supporting a plurality of logs consists of at least two arcuate arms disposed in horizontal spaced relation.

6. A tree-handling attachment as defined in claim 5, including an end plate on at least one of said arms providing an end abutment for logs on the arms of maintain such ends of a stack of logs in alignment.

7. A tree-handling attachment as defined in claim 5, including means pivotally attaching each of said arms to said frame and further including stop means limiting pivoting of said arms in one direction to maintain the same directed outwardly from the frame in a load-receiving position, said pivot mounting permitting the arms to move upwardly to pass over obstacles encountered during movement of the mobile base.

8. A tree-processing machine as defined in claim 1 wherein said tree off-feed mechanism is secured to said base for movement therewith.

9. A tree processing machine as defined in claim 1 wherein said tree off-feed mechanism is pivotally mounted on said base for slewing about a substantially vertical axis.

10. A tree-processing machine as defined in claim 9 wherein said processing unit and first boom and grapple assembly are mounted on a common support pivotally mounted on said mobile base for slewing about a vertical axis independent of slewing motion of said tree off-feed mechanism.

11. A tree-processing machine as defined in claim 1 wherein said processing unit and first boom and grapple assembly are mounted on a common support pivotally mounted on said mobile base for slewing about a vertical axis.

12. A tree-processing machine as defined in claim 1, including deflector means for directing logs onto a cradle providing said log-supporting means.

13. A machine as defined in claim 12 wherein the directing means includes a pivotally mounted portion providing a gate and thereby selectively interrupting the flow of logs onto the cradle while the previously deposited logs are removed therefrom.

14. A tree-handling attachment as defined in claim 13, including a further cradle mounted on said frame and located such as to receive the logs during said interruption of flow of the same onto the first-mentioned cradle whereby processed logs may be selectively sorted.

15. A tree processing machine as defined in claim 12 wherein said deflector includes members sloping in a direction from where the logs strike the same upon discharge from the last of one or more processing units in a direction toward the tree collecting means.

16. A tree-processing machine as defined in claim 15 wherein said deflector means includes a movable portion selectively directing processed logs as they are received to one of two or more different log-receiving locations.

17. A tree-handling attachment as defined in claim 16 wherein one of said log-receiving locations includes means for subsequently transferring the logs therein to one of the other log-receiving locations so as to provide a temporary storage for logs during processing while the latter is being cleared.

18. A tree-processing machine as defined in claim 16 wherein said movable portion is pivotally mounted on said frame and has an upper log-receiving portion arcuate in shape transverse to the length of a log discharged thereonto and wherein the pivot axis extends in a direction generally parallel to the length of such log.

19. A tree processing machine as defined in claim 1 including further means on said frame for supporting a plurality of logs discharged from the processing unit and movable deflector means selectively directing processed logs to one or the other of said means for supporting the log or said further means for supporting the logs.

20. A tree processing machine as defined in claim 19 wherein each of said log-supporting means comprises two or more arcuate arms secured to said frame and extending outwardly and downwardly therefrom with the concave portion being directed upwardly and with the arms disposed in horizontal spaced relation, one of said log-supporting means being located on one side of said frame and the other log-supporting means on the opposite side, said movable deflector being located therebetween and including a gate pivotally mounted on said frame.